Dec. 8, 1953  H. C. RHODES  2,661,880
BREAD PANNING MACHINE
Filed July 20, 1948  3 Sheets-Sheet 1

INVENTOR
HERBERT C. RHODES

ATTORNEY

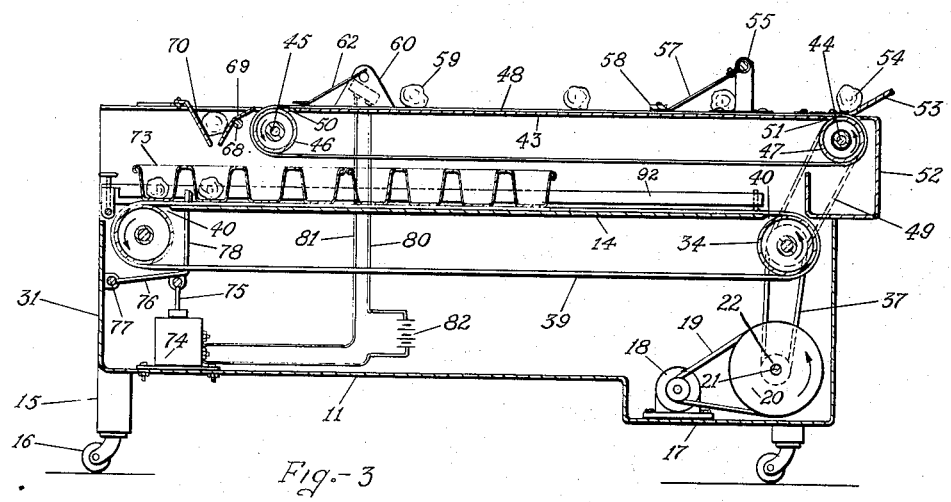
Fig.-3
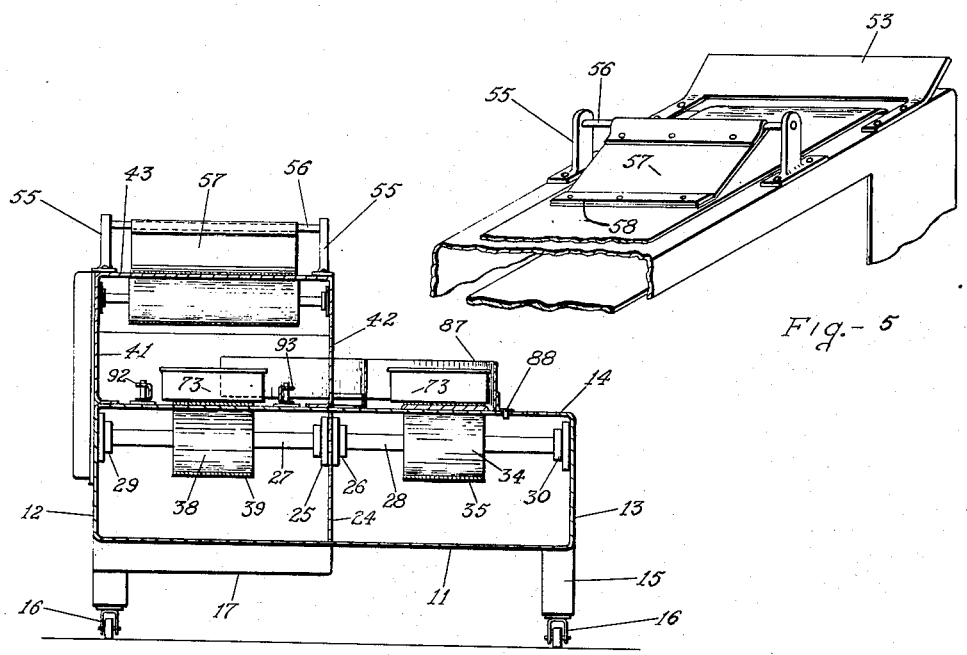
Fig.-5
Fig.-4
INVENTOR
HERBERT C. RHODES.
BY [signature]
ATTORNEY Dec. 8, 1953          H. C. RHODES          2,661,880
BREAD PANNING MACHINE
Filed July 20, 1948          3 Sheets-Sheet 3
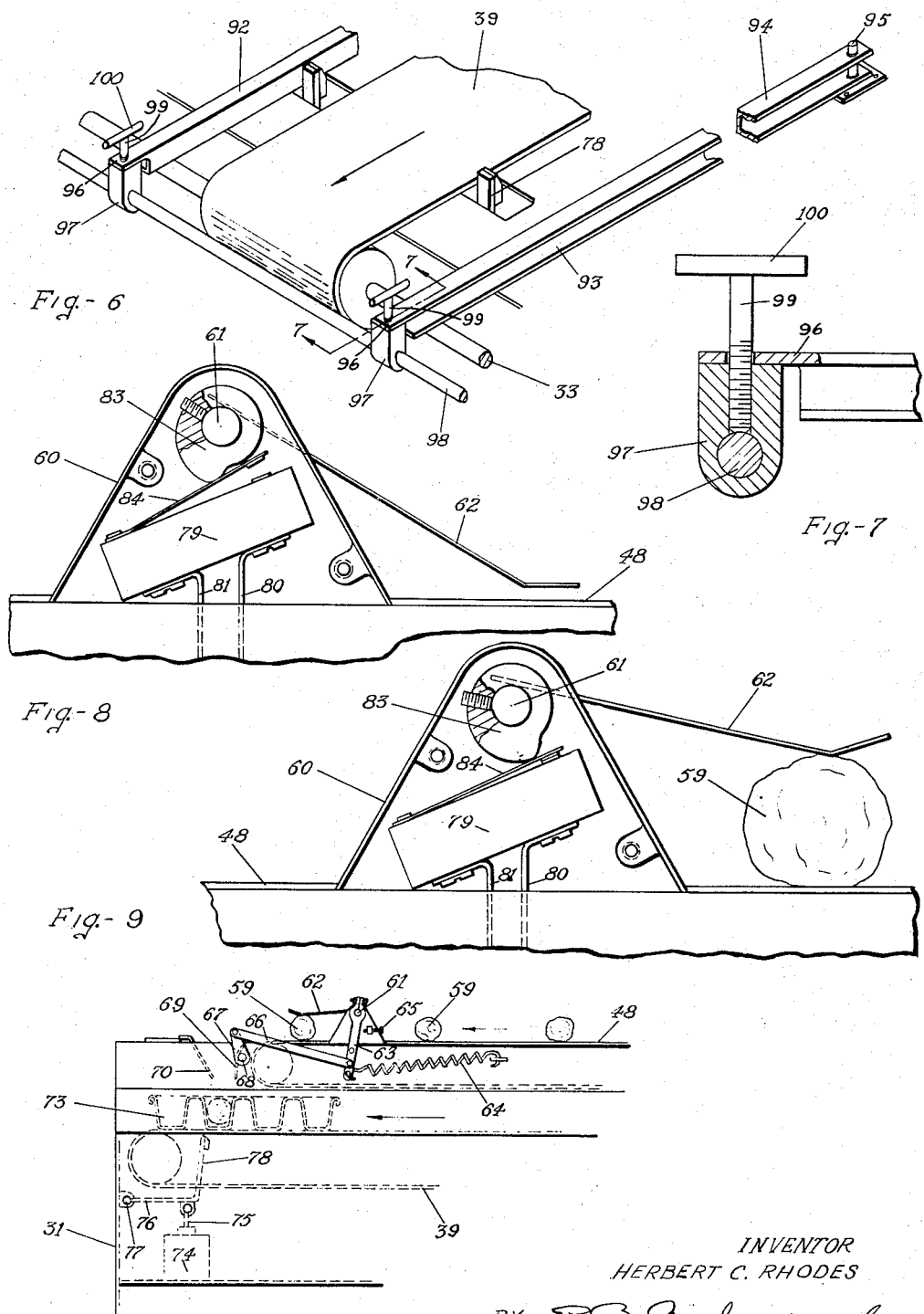
INVENTOR
HERBERT C. RHODES
ATTORNEY Patented Dec. 8, 1953

2,661,880

UNITED STATES PATENT OFFICE 2,661,880

BREAD PANNING MACHINE

Herbert C. Rhodes, Portland, Oreg., assignor to Read Standard Corporation, a corporation of Delaware Application July 20, 1948, Serial No. 39,626

3 Claims. (Cl. 226—2)

This invention relates generally to baking equipment and particularly to a means for reversing direction of pans in bread panning machines.

The main object of this invention is to provide a means for reversing the travel of pans from a conveyor line and to feed the pans into a panning machine.

The second object is to provide a machine of the class described which will save the labor of one man and at the same time insure the proper delivery and insertion of pans into the panning machine.

The third object is to produce a machine for this purpose which will be fully automatic and adjustable to a wide range of pan sizes.

A further object is to so construct the panning portion of the device that pieces of dough may be accurately placed within a pan without touching it by hand and at the same time providing a wide range of adjustment for pan sizes and length of the pieces of dough to be placed in the pans.

I accomplish these and other objects in the manner set forth in the following specification as illustrated in the accompanying drawings, in which:

Fig. 3 is a section taken along the line 3—3 in Fig. 1, showing the pans on the return belt being filled.

Fig. 4 is a section taken along the line 4—4 in Fig. 1, showing pans on the feed belt and return belt, adjustable fence and pan guides.

Fig. 5 is a fragmentary perspective of the dough feed belt and dough straightener.

Fig. 6 is a fragmentary perspective showing a detail of the pan guides and fingers that hold the pans.

Fig. 7 is a fragmentary section taken along the line 7—7 in Fig. 6, showing detail of securing pan guides.

Fig. 8 is a fragmentary detail of the cam on the operating shaft showing the micro-switch open.

Fig. 9 is a fragmentary view similar to Fig. 8, showing the micro-switch in a closed position.

Fig. 10 is a fragmentary general view, showing the operation of pan filling.

Like numbers of reference refer to the same or similar parts throughout the several views.

Figure 1:
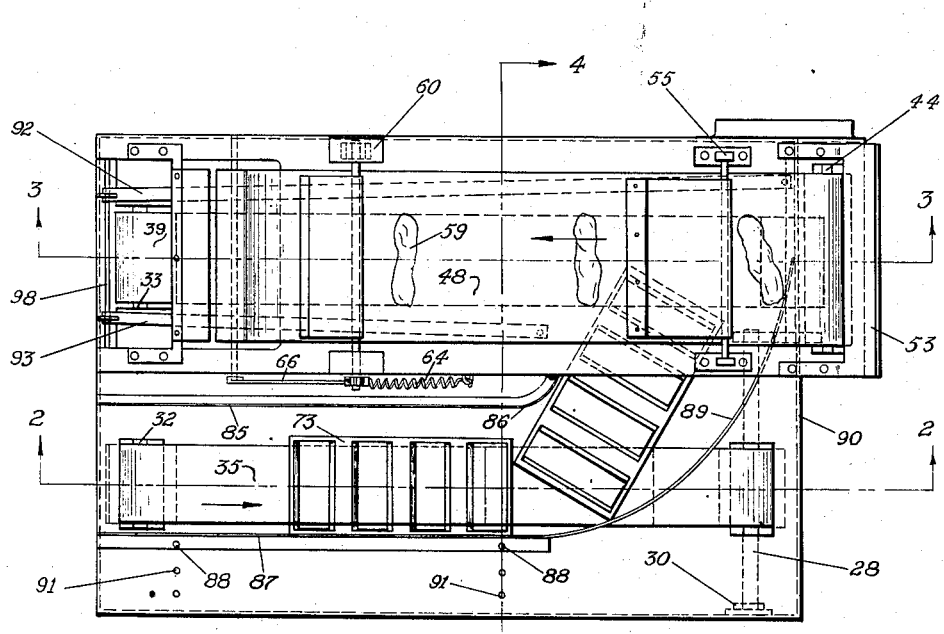
Fig. 1 is a plan of the dough panner showing the general arrangement.

Referring in detail to the drawings, there is shown a panner which is built around a box-like frame including a bottom 11, the sides 12 and 13 and top 14, all of which are supported by the legs 15 under which are casters 16.

One side of one end of the bottom 11, as best shown in Figure 3, has a motor floor 17 which is somewhat below the bottom 11. Resting on the floor 17 is a drive motor 18 which, through the belt 19, drives the pulley 20 on the countershaft 21 on which are secured the pulleys 22.

Between the sides 12 and 13, as shown in Figure 4, there is disposed a partition 24 in which is supported bearings 25 and 26 for the shafts 27 and 28 whose outer ends are supported by the bearings 29 and 30 mounted on the walls 12 and 13. The shafts 27 and 28 revolve in opposite directions.

Duplicates of the bearings 25, 26 and 29 and 30, not shown, are mounted on the discharge end 31 for the shafts 32 and 33.

Figure 2:
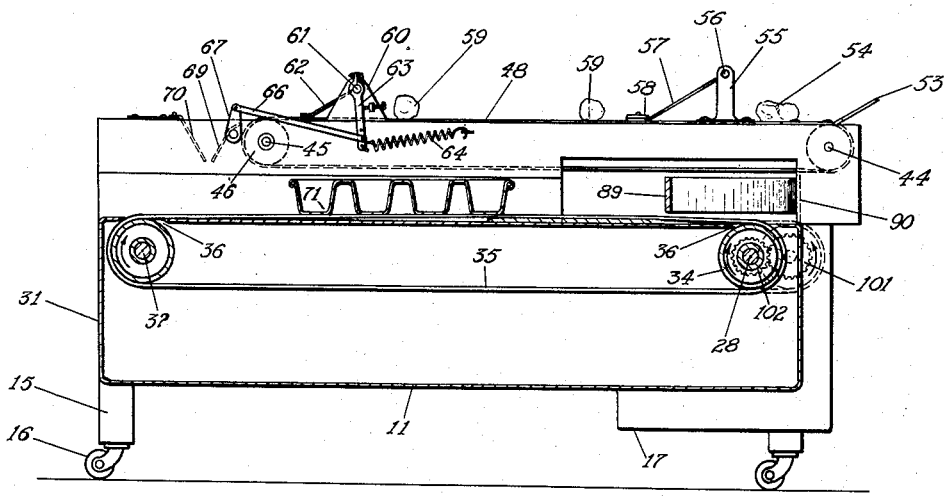
Fig. 2 is a section taken along the line 2—2 in Fig. 1, showing the bread pans being fed into the panner on a conveyor belt.

On the shaft 28 is secured a pulley 34, the top run of whose conveyor belt 35 passes through slots 36 in the top 14 and slides along the top side thereof, as best shown in Figure 2. Rotation is supplied to the shaft 28 through the belt 37.

On the shaft 27 is secured a pulley 38, the top run of whose return belt 39 passes through the slots 40 in the top 14 and slides along the top side thereof, as best shown in Figure 3.

It will be noted that the top run of the belt 39 is toward the outlet end 31, while the top run of the belt 35 is in the opposite direction.

The manner of obtaining the reverse directions will be described later.

Directly above the side 12, referring to Figure 4, there is a top side 41 and above the partition 24 is placed the top side 42. The top sides 41 and 42 are joined by a cover 43. Mounted across the sides 41 and 42, see Figure 3, are the shafts 44 and 45 around whose rolls 46 and 47 passes the dough-feed belt 48 which is driven by the belt 49.

The top run of the dough-feed belt 48 moves in the same direction as does the top run of the belt 39; namely, in the direction of the end 31 which is the operator's end of the machine.

The belt 48 passes through the slots 50 and 51 in the cover plate 43.

Near the intake end 52 of the machine is mounted an inclined plate 53 which guides the chunk of dough 54 onto the belt 48.

Illustration and explanation of the means for preparing the piece of dough 54:

In front of the plate 53, and secured to the cover plate 43, are the spaced standards 55 across which is mounted the horizontal rod 56 to which is attached a flexible web 57 of woven wire cloth or canvas having the weighted end 58, under which the piece of dough 54 is rolled to which it with relation to the belt 48 and to give it a finishing touch; that is, to put it in shape for the pan so that it assumes the form of a cylinder 59.

A second pair of standards 60 is mounted on the cover plate 43 near the roll 46 and support the rock shaft 61 to which is attached a gate 62 under which the roll of dough 59 must pass, causing the gate 62 to rise as shown in Fig. 10.

Also secured on the shaft 61 is a lever 63 which is urged in one direction by a spring 64 toward an adjustable stop screw 65 mounted on a standard 60 in the path of the lever 63.

A link 66 connects the lever 63 to the crank 67 on the rock shaft 68 to which is attached the vane 69 which is normally inclined as shown in Fig. 2, forming one side of a dough positioning trough of which the fixed sloping side 70 forms the other side. When the gate 62 is raised by a piece of dough passing under it, the vane 69 moves away from the fixed side 70 permitting the dough 59 to fall into a pan 71 of which groups are tied together by means of the rims or in any other convenient manner, to form sections 73.

It will be understood that the pans 71 are on the belt 39, directly under the dough-feed belt 48.

In order that each group or section 73 of pans may be stopped intermittently so that successive empty pans 71 will be presented for loading under the members 69 and 70, I have provided a special indexing mechanism.

Under the belt 39 is placed a solenoid 74 whose core 75 is attached to the bell crank lever 76 pivoted on the pin 77 attached to end 31. The lever 76 has an upturned end 78 which, in a raised position as shown in Fig. 3, will engage the foremost side of a pan 71 and stop it, although the belt 39 upon which the pan 71 rests, continues to move.

Within one of the standards 60 is placed what is known as a micro-switch 79, the nature and use of which is well known, being simply a mechanically closed and spring opened switch whose leads 80 and 81 are connected to a source of power 82 and to the solenoid 74.

On the rock shaft 61 is secured a cam 83 which actuates the switch contact arm 84.

The operation of this portion of the device is simply as follows:

When a piece of dough 59 passes under the gate 62, causing it to rise, as shown in Fig. 10, it does two things: first, it opens the vane 69, permitting the piece of dough 59, which is being held thereby, to drop into a pan 71 directly below same, during which time the cam 83 closes the switch 79 operating the solenoid 74 and withdrawing the end 78, permitting the pans 71 to move one-pan space under the driving action of the belt 39.

Since the raising of the gate 62 is only momentary, then the withdrawal of the end 78 is momentary and the next empty pan is held in waiting underneath the space between the members 69 and 70.

In other words, there is always a piece of dough waiting to be dropped into a pan and it is released into the pan by the next piece of dough following, and so on.

Referring now to the conveyor belt 35, it will be noted that while it is parallel to the return belt 39, there is at one side of the belt 35 a fence 85 whose end 86 curves into the top side 42. A fence 87 at the opposite side of the belt 35 is adjustably mounted on the top 14 by means of pins 88 which extend into the top 14. The fence 87 has a curved portion 89 which extends across the belt 35 to the end wall 90 at a point along the center line of the belt 39.

With the belts 35 and 39 rotating in opposite directions sections of pans 73, Figure 1, are placed upon conveyor belt 35 adjacent the forward end of the machine and these pans will be carried towards the rear end of the machine. As the pans approach the rear end portion of belt 35 the right hand forward corner of each section of pans, as viewed in Figure 1, will engage the outer fence 87 and the continuous rotation of belt 35 will force the section of pans against the curved portion 89 of the fence 87 so that the pans will be gradually turned as they follow the contour of the portion 89 of the fence 87, and thus be directed towards the inner end of belt 39. By providing the inner end of fence 87 with a curved portion 89 which extends across both belts 35 and 39, the section of pans will follow this curved portion of the fence 87 as long as a portion of the section of pans remains in engagement with belt 35. In addition, subsequent sections of pans will engage one another and tend to force the preceding section of pans around the curved portion 89 of the fence 87 to enable the pans to be moved from one belt to the other.

As the forward end of each section of pans engages the inner end of belt 39, the rotative movement of belt 39 being counter to the rotative movement of belt 35, the section of pans will tend to move towards the front of the machine in a sideways manner until they engage the curved end 86 of the fence 85. Thus with the section of pans engaging the curved end 86 of the fence 85 and the forward end of the section of pans being disposed on the belt 39, and the rear portion disposed on the belt 35, and with the belts rotating in opposite directions the pans will be swung around the curved end 86 so that the rear end portion of the pans will follow the curved portion 89 of the fence 87. This swinging movement of the section of pans will be aided and abetted by the subsequent sections of pans carried by the belt 35. The rotation of belt 39 on the forward end portion of the section of pans will tend to draw the section of pans onto this belt, while the rotation of belt 35 will tend to force the rear portion of the pans off of this belt and around the curved portion 89 of the fence 87. The section of pans in being transferred from belt 35 to belt 39 are properly positioned on belt 39 by the fences 92 and 93, so that the forward end portion of each section of the pans will engage the fences 92 and 93 to properly position the pans on the belt 39 as the section of pans moves towards the forward end of the machine.

By setting the pins 88 in the proper holes 91, various sizes of pans 71 may be used.

The pair of movable fences 92 and 93 have ends 94 which are pivoted on the pins 95, while the ends 96 are carried by the slide 97 on the guide rod 98 which is stationary over the end wall 31. Set screws 99 extend through the slides 97 and engage the rod 98.

The T handle 100 on each screw 99 assists in the tightening of the screw without the aid of a wrench.

In order to secure the needed reversal in the direction of travel between the belts 35 and 39, I have employed the spur gearing 101 and 102, as shown in Figure 2. Obviously, any other manner of accomplishing this, such as crossed belts or separate drive motors, may be employed without departing from the spirit of this invention.

It can be seen that one man standing at the end 31 can take care of the loaded pans and return empties to the machine which, on existing machines, requires the services of two men. Also the manual loading of the pans is dispensed with and the operation is made more sanitary as well as less expensive.

It will be noted in Fig. 4 that the conveyor belt 35 is somewhat above the return belt 39 on the top side thereof. This is essential to the operation of the device.

I claim:

1. In a bread panner embodying a pair of conveyors arranged in superposed spaced relation, a pair of spaced standards extending above the topmost conveyor, a shaft supported in said standards, a gate mounted on said shaft for rotation therewith and positioned intermediate the standards and engageable with the topmost conveyor, a trough positioned above the lower conveyor and at an end of said topmost conveyor for receiving a roll of dough from said topmost conveyor, one side of said trough being stationary and the other side movable to facilitate the ejection of a roll of dough towards said lower conveyor, a rock shaft affixed to the movable side of said trough, linkage interposed between said rock shaft and said shaft for moving said movable side to open said trough upon each actuation of said gate by a roll of dough carried by the topmost conveyor, said lower conveyor being adapted to carry a plurality of pans to receive rolls of dough from said trough, a pawl adapted to arrest said pans beneath said trough, means connected to said pawl for retracting said pawl from said pans upon each actuation of said gate and means operated upon the rotation of said shaft for actuating said first named means.

2. In a bread panner embodying a pair of conveyors arranged in superposed spaced relation, a pair of spaced standards extending above the topmost conveyor, a rock shaft supported in said standards, a gate mounted on said shaft intermediate the standards and engageable with the topmost conveyor, a trough positioned above the lower conveyor and at an end of said topmost conveyor for receiving a roll of dough from said topmost conveyor, one side of said trough being movable to facilitate the ejection of a roll of dough towards said lower conveyor, linkage interposed between said rock shaft and the movable side of said trough for opening said trough upon each actuation of said gate by a roll of dough carried by the topmost conveyor, said lower conveyor being adapted to carry a plurality of pans to receive rolls of dough from said trough, a pawl adapted to arrest said pans beneath said trough, a solenoid, linkage connecting said solenoid with said pawl, an electric circuit connected to said solenoid and having a switch therein, means on said rock shaft engageable with said switch for closing the circuit to energize the solenoid upon each actuation of said gate by a roll of dough carried by the topmost conveyor.

3. In a bread panner embodying a pair of conveyors arranged in superposed spaced relation, a pair of spaced members extending above the topmost conveyor, a shaft supported in said members transversely of said conveyor, a gate having one end affixed to said shaft and the other end engageable with said conveyor, a trough positioned above the lower conveyor and at an end of the topmost conveyor for receiving a roll of dough from the topmost conveyor, one side of said trough being movable to facilitate the ejection of a roll of dough towards said lower conveyor, said lower conveyor being adapted to carry a plurality of pans to receive rolls of dough from said trough, a rock shaft affixed to the movable side of said trough, a crank on said rock shaft, a link secured to said crank, a lever having one end secured to said link and the other end secured to the shaft supported in said members, said shaft connected to the movable side of said trough through said lever, link and crank for actuating same contemporaneous with each raising of said gate by a roll of dough carried by said topmost conveyor.

HERBERT C. RHODES.

References Cited in the file of this patent

UNITED STATES PATENTS

| Number | Name | Date |
|---|---|---|
| 1,312,640 | Mallinckrodt | Aug. 12, 1919 |
| 1,357,476 | Rogers et al. | Nov. 2, 1920 |
| 1,427,325 | Quick | Aug. 29, 1922 |
| 1,516,016 | Kallenbach | Nov. 18, 1924 |
| 1,733,409 | Howe | Oct. 29, 1929 |
| 1,781,546 | Harber | Nov. 11, 1930 |
| 1,805,018 | Scruggs | May 12, 1931 |
| 1,871,216 | Kirchoff | Aug. 9, 1932 |
| 2,337,526 | Steadman et al. | Dec. 21, 1943 |
| 2,349,423 | Harber | May 23, 1944 |